G. SHOVE.
Cranberry Gatherer.
No. 46,760.
Patented Mar. 7, 1865.
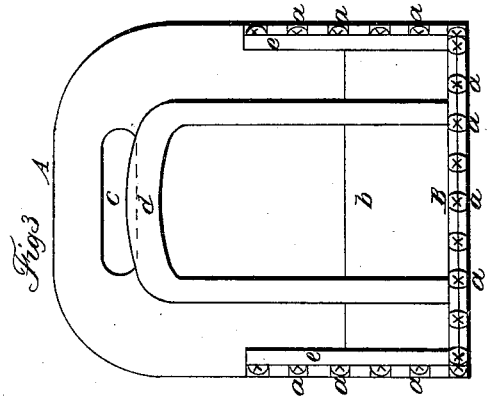
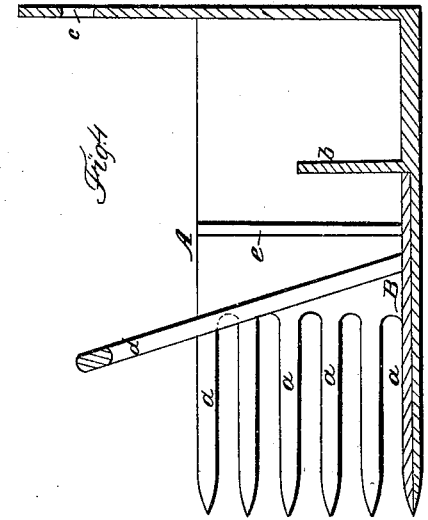
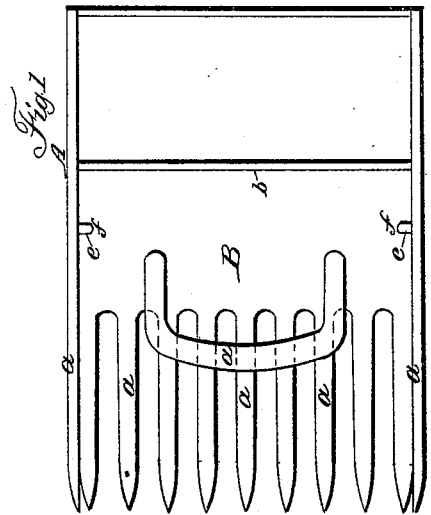
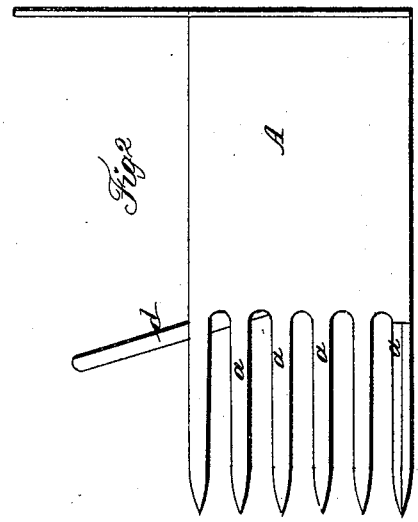
Witnesses
Frederick Cutts
Inventor
George Shove
By his Attorney
R. H. Eddy

UNITED STATES PATENT OFFICE.

GEO. SHOVE, OF YARMOUTH, MASSACHUSETTS, ASSIGNOR TO HIMSELF AND CHAS. THACHER, OF SAME PLACE.

IMPROVED CRANBERRY-GATHERER.

Specification forming part of Letters Patent No. 46,760, dated March 7, 1865.

*To all whom it may concern:*

Be it known that I, GEORGE SHOVE, of Yarmouth, in the county of Barnstable and State of Massachusetts, have invented an Improved Cranberry-Gatherer; and I do hereby declare the same to be fully described in the following specification and represented in the accompanying drawings, of which—

Figure 1 is a top view, Fig. 2 a side elevation, Fig. 3 a front end view, and Fig. 4 a longitudinal section, of it.

In such drawings, A denotes a box-shaped receiver, whose front end is open, and whose two sides and bottom are formed or provided with teeth *a a*, &c., arranged as represented in the figures. A partition, *b*, goes across the receiver in rear of its teeth and extends about half-way up its sides. The rear end of the receiver is made with a hole or passage, *c*, through which the hand of a person may be inserted for the purpose of lifting the apparatus.

Within the receiver and arranged flatwise on its bottom there is a comb, B, provided with a lifter or handle, *d*, inclined at an acute angle with the comb, in the manner as shown in the drawings. The teeth of this comb correspond in number and distances apart with those of the bottom of the receiver, the lower side of each tooth of the comb and the upper side of the tooth directly beneath it being flat, in order that when the teeth of the comb are placed on those of the bottom of the receiver they may fit closely together.

Vertical guides or ledges *e e* are arranged on the inner sides of the receiver, in manner as shown in Figs. 1 and 3, and they enter corresponding notches, *f f*, made in the edges of the comb. The ledges serve to guide the comb while being raised upward.

The above-described fruit-gatherer is specially designed to be used in gathering cranberries or fruit growing on low vines. In the employment of it for such purpose the comb, while the teeth of the receiver are being forced between the vines, should be down on the bottom of the receiver, and with the teeth of the comb in contact with those of the receiver. After the comb and the receiver may have been forced into a mass of the vines, the receiver, by one hand of the operative, should be pressed down upon the ground out of which such vines may be growing, and the comb should be drawn upward away from the vines, so as to pull the berries from them and discharge such berries into the receptacle *g* in rear of the partition.

I claim as my invention—

1. The arrangement and combination of the lifting-comb B, in the manner substantially as described, with the receiver A, provided with teeth, as explained.

2. The combination of the partition *b* with the toothed receiver A and the lifting-comb B, arranged and so as to operate together substantially as described.

3. The arrangement of the handle of the lifting-comb at an inclination, as described, with the comb, when such comb is disposed with a toothed receiver substantially in manner as set forth, the purpose of such arrangement being to cause the comb, while being raised upward, to be tilted backward, so as to discharge the berries into the space in rear of the partition of the receiver.

GEO. SHOVE.

Witnesses:
WM. P. DAVIS,
GEORGE OTIS.